Patented Dec. 30, 1941

2,267,759

UNITED STATES PATENT OFFICE 2,267,759

METHOD OF PRODUCING TRANS-ANDROSTERONE AND ITS DERIVATIVES

Arthur Serini, Berlin, and Lothar Strassberger, Berlin-Wilmersdorf, Germany, assignors, by mesne assignments, to Schering Corporation, Bloomfield, N. J., a corporation of New Jersey No Drawing. Application March 4, 1936, Serial No. 67,070. In Germany March 11, 1935

4 Claims. (Cl. 260—397.4)

One object of the present invention is the production of trans-androsterone and its derivatives of the general formula $C_{19}H_{29}OX$ wherein X represents either an OH group or a group that on hydrolysis is reconvertible into the OH group, by a method comprising subjecting dehydro-androsterone and its derivatives of the general formula $C_{19}H_{27}OX$ wherein X represents either an OH group or a group that on hydrolysis is reconvertible into the OH group, to the action of hydrogenating agents under conditions whereby only the carbon to carbon double bond present in the ring system of the molecule of the starting material is hydrogenated. Other objects of this invention will be evident from the following more detailed description and the subjoined claims.

The dehydro-androsterone used as starting material may be prepared, for instance, by oxidizing unsaturated sterols as described in the copending application of Schoeller et al., Ser. No. 41,202, filed September 19, 1935.

Instead of dehydro-androsterone its derivatives may be used wherein the hydroxy group present in the molecule of the dehydro-androsterone is replaced by a group which upon hydrolysis is reconvertible into the hydroxy group, for instance, by an ester, ether and the like group.

The trans-androsterone and its derivatives possess a physiological activity similar to that of male sex hormone, androsterone, itself. Moreover these products can serve as intermediate products for the manufacture of other valuable compounds having the properties of the germinal gland hormones.

The process of the present invention may be illustrated by the following structural formulas wherein X indicates either OH or a group that upon hydrolysis is reconvertible into an OH group such as, for instance, O-acyl, O-alkyl, O-aryl, or the like.

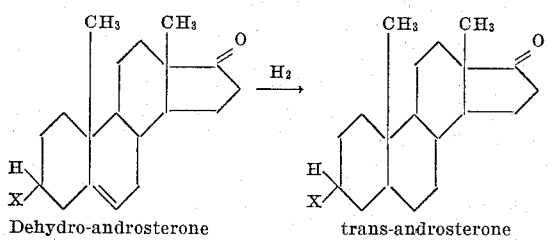

Dehydro-androsterone      trans-androsterone

The following examples serve to illustrate the process of the present invention without, however, limiting the same to them:

Example 1

1 gram of dehydroandrosterone is catalytically hydrogenated in the presence of 0.3 gram of platinum black in 30 ccs. of glacial acetic acid at room temperature. After the taking up of 1 mol of hydrogen the hydrogenation is interrupted, the whole poured into water, the separated product taken up in ether and the ether extract washed with dilute alkali lye. The transandrosterone remaining after evaporation of the solvent is recrystallised from dilute alcohol. M. P. 170° C. 1 capon unit=500γ.

Example 2

1 gram of dehydroandrosterone acetate is hydrogenated according to Example 1. There is thus obtained the trans-androsterone acetate of M. P. 117–118° C. 1 capon unit corresponds likewise to about 500γ; the activity persists longer than that of the free transandrosterone. By saponification of this ester with 10% methyl alcoholic caustic soda lye the trans-androsterone can be obtained.

Instead of the specified hydrogenating agents there can also be employed other agents, as are described in Houben-Weyl, "Methoden der organishchen Chemise," 2nd vol., 2nd edition, Leipzig, 1922, p. 252 sq., it only being necessary to take care that no further reduction takes place than the saturation of the double bond in the molecule of the dehydroandrosterone, the reduction preferably taking place in the presence of solvents at temperatures below 100° C.

What we claim is:

1. A method for the production of trans-androsterone and its derivatives of the general formula $C_{19}H_{29}OX$ wherein X represents a member of the group consisting of OH and ester and ether groups, comprising subjecting a dehydro-androsterone compound of the general formula $C_{19}H_{27}OX$, wherein X is as above identified to the action of hydrogen in the presence of platinum under conditions whereby only the carbon to carbon double bond present in the ring system of the molecule of the starting material is hydrogenated.

2. A method according to claim 1 comprising carrying out the hydrogenation in a solvent for the dehydroandrosterone compound at a temperature below 100° C.

3. A method for the production of trans-androsterone and its derivatives of the general formula $C_{19}H_{29}OX$, wherein X represents a member of the group consisting of hydroxyl, ester and ether groups, comprising subjecting a dehydro-androsterone compound of the general formula $C_{19}H_{27}OX$, wherein X is as above defined, to the action of hydrogen in the presence of a platinum black catalyst at room temperature and in the presence of glacial acetic acid as solvent.

4. A method according to claim 1 wherein X is a group which on hydrolysis is converted into a hydroxy group, and wherein the hydrogenated product is saponified.

ARTHUR SERINI.
LOTHAR STRASSBERGER.